Nov. 25, 1969     M. W. JEROME     3,480,034

VALVE RESPONSIVE TO A PULSATING FLUID PRESSURE

Filed Aug. 7, 1967

INVENTOR:-
MAURICE WILLIAM JEROME

United States Patent Office 3,480,034
Patented Nov. 25, 1969

3,480,034
VALVE RESPONSIVE TO A PULSATING
FLUID PRESSURE
Maurice William Jerome, Ringwood, England, assignor to
Wright Rain Limited, Crowe, Ringwood, Hampshire,
England
Filed Aug. 7, 1967, Ser. No. 658,687
Claims priority, application Great Britain, Aug. 26, 1966,
38,384/66
Int. Cl. G05d 11/00; A01g 25/02
U.S. Cl. 137—119          4 Claims

ABSTRACT OF THE DISCLOSURE

A valve, particularly for controlling a water sprinkler, including a valve member biased to a closed position and movable therefrom towards an open position in response to pulses of fluid pressure applied through a supply pipe to said valve member. The valve also includes a ratchet device preventing said valve member from entering said open position until a predetermined number of fluid pressure pulses has been applied to said valve member subsequent to the immediately preceding opening thereof.

---

The invention relates to a valve responsive to a pulsating fluid pressure and is particularly concerned with a valve for opening and closing a pipe-line to which an intermittent or a pulsating pressurised fluid supply is arranged to be applied.

An object of the invention is to provide a valve which will only open after it has been subjected to a predetermined number of pulses of fluid pressure subsequent to the immediately preceding opening thereof.

According to the invention, the valve includes a valve member biased to a closed position and movable therefrom towards an open position in response to pulses of fluid pressure applied to said valve member and means preventing said valve member from entering said open position until a predetermined number of fluid pressure pulses has been applied to said valve member subsequent to the immediately preceding opening thereof.

Conveniently, said means for preventing opening of said valve member comprises a ratchet device arranged to be operated step-by-step by said valve member in response to successive pressure pulses applied thereto, the ratchet device having teeth of such size or spacing that in at least one of its step-by-step positions it will permit the valve member to open; but in all others of its step-by-step positions, it will arrest the member before the latter opens.

By way of example, one form of valve in accordance with the invention will now be described with reference to the accompanying drawings in which.

Figure 1:
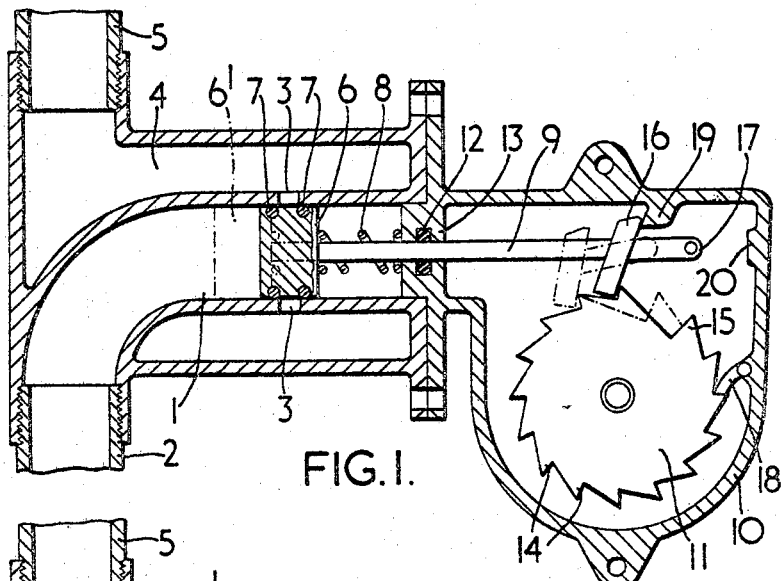
FIGURE 1 is a section through the valve, showing the latter closed.
Figure 2:
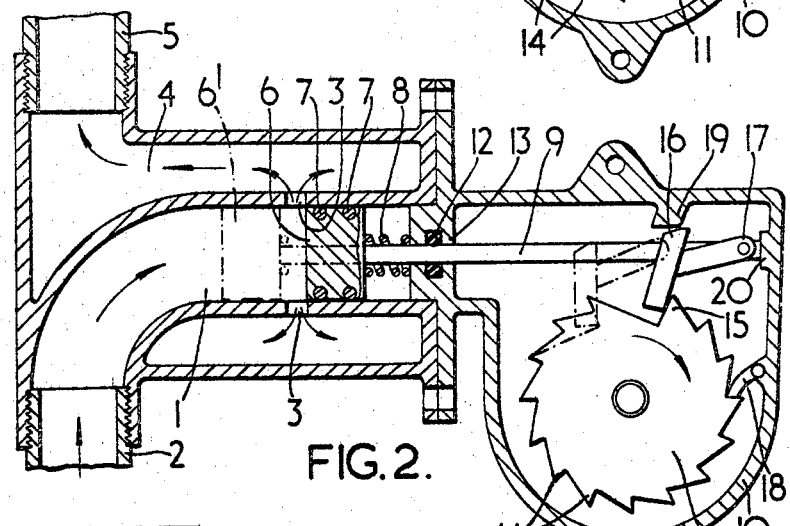
FIGURE 2 is a similar view showing the valve open.

Referring to FIGURES 1 and 2, the valve comprises a housing defining an inlet passage 1 connected to a supply pipe 2 to which an intermittent or pulsating pressurised fluid supply is to be introduced. The passage 1 has two or more ports 3 therein arranged to communicate with an annular outlet passage 4 surrounding the inlet passage 1. The annular passage 4 communicates with an outlet pipe 5. The inlet passage 1 in the vicinity of the ports 3 forms a cylinder in which runs a piston 6. The latter is provided with circumferential grooves in which sealing O-rings 7 are fitted. The piston 6 is biased by a spring 8 to the left into a position, indicated by 6' in broken lines in FIGURE 1, in which it is upstream of the ports 3.

The piston 6 is mounted on a piston rod 9 extending coaxially through the spring 8 and passing through a hole in an end wall 13 of a compartment 10 containing a ratchet wheel 11. The rod 9 is sealingly engaged by an O-ring 12 located in a recess in the end wall 13. The ratchet wheel has a plurality of teeth 14 of identical shape and circumferential spacing and one larger tooth 15 spaced circumferentially from the immediately preceding tooth 14 by a distance greater than the spacing between two adjacent teeth 14. The teeth 14 and 15 are engageable by a pawl 16 carried on an arm 17 pivotally attached to the end of the rod 9 remote from the piston 6. On each application of a pressure pulse against the left-hand end, as viewed in the figures, of the piston 6, the pawl 16 engages a tooth of the ratchet wheel 11 and so indexes the latter through one step in the clockwise direction as viewed in the figures. On reduction of pressure within the inlet pipe 2, the spring 8 returns the piston 6 to the left as viewed in the figures. The ratchet wheel 11 is prevented from rotation in the reverse direction, i.e., the anticlockwise direction as shown in the figures, by means of a second pawl 18 pivotally mounted in the compartment 10.

So long as the pawl 16 is engaging one of the teeth 14, it will be held in the position shown in full lines in FIGURE 1 by an abutment 19, extending inwardly from the upper wall of the compartment 10. Thus the piston 6 can only be moved from the position shown in broken lines at 6' in FIGURE 1 to the position shown in full lines in FIGURE 1 and so the ports 3 will not be uncovered and fluid cannot flow from the pipe 1 into the annular chamber 4. When the ratchet wheel 11 has been indexed by a sufficient number of steps, the pawl 16 will engage the larger tooth 15 and will pivot downwardly, as viewed in the figures, until it has cleared the abutment 19. Fluid pressure acting on the left hand end of the piston 6 will therefore push the latter, the rod 9 and the pawl 16 past the abutment 19 until the right hand end of the rod 9 engages an abutment 20 on the right hand end wall of the compartment 10, as shown in FIGURE 2. The corresponding position of the piston 6 is shown in full lines in FIGURE 2 at 6" and in this position, the piston 6 has moved to the right of the ports 3, thereby uncovering the latter and permitting fluid to flow from the inlet passage 1 into the outlet passage 4 and hence to the outlet pipe 5. When the pressure of fluid is reduced, the spring 8 will cause the piston 6 to return to the position 6' shown in the figures, when the pawl 16 will again be ready to engage a tooth 14 of the ratchet wheel 11. It will then be necessary for the piston 6 to be subjected to a number of pressure pulses equal to the number of teeth 14, before the valve can be opened again.

Several valves in accordance wih this invention may be used for controlling the flow of water through a number of different sprinkler lines in an irrigation system fed by a common supply. By providing one of the valves in each sprinkler line and by adjusting the ratchet wheel 11 of each valve relatively to those of the valves controlling the other sprinkler lines, the sprinklers can be made to operate in any desired sequence under the control of the common supply, which is made to pulsate either by a pump or by another pulsating device provided in a supply pipe common to all the sprinkler lines.

Alternatively, instead of controlling the sequence by altering the relative angular positions of the retchet wheels 11, each ratchet wheel may have a different number of teeth 14 or more than one larger tooth 15. When a valve controlling a sprinkler line has opened, it may be kept open for any desired time by changing the intermittent or pulsating supply to a continuous one. The valve will then remain open until the supply pressure is reduced sufficiently to permit the spring 8 to return the piston to its closed position.

Figure 3:
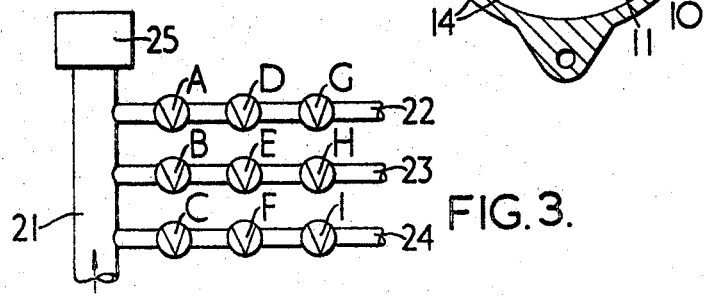
FIGURE 3 is a diagram showing an irrigation pipeline system including a plurality of valves each of the kind shown in FIGURES 1 and 2.

FIGURE 3 is a diagram showing an irrigation pipeline system comprising a main supply pipe 21 connecting with several branch or sprinkler supply pipes 22, 23, 24 (of which three only are shown) arranged in parallel. The main supply pipe 21 includes a pump 25 capable of applying pulses of pressure to the main supply pipe and therefore to all the sprinkler supply pipes. The sprinkler supply pipes 22, 23, 24 each lead to water sprinkler devices to which the flow of water is controlled by valves A to I. Each of these valves is of the kind shown in FIGURES 1 and 2 and may be set to operate in response to a predetermined number of pulses applied by the pump 25, either by adjusting the ratchet wheel 11 or by using a ratchet wheel having a particular number and arrangement of teeth 14 and 15. One particular sequence of operation of the valves is as follows:

The valves A, B and C are arranged to open as soon as water pressure is applied to the main supply pipe 21; but all the other valves are arranged to open in response to more than one pulse only. Therefore as soon as the water supply is turned on only the sprinklers fed by the open valves A, B and C will operate, all the other valves remaining closed. This operation will continue until the pump 25 is operated to apply a pulsating pressure. The valves A, B and C will close after a predetermined number of pulses. Then valves D, E and F will open, the other valves remaining closed. Then after another predetermined number of pulses, the valves D, E, F will close and the valves G, H, I will open. In this way, all the valves are opened and closed in sequence and the sprinklers correspondingly operated. After operation of all the sprinklers, the pulsating pressure can be maintained by continued operation of the pump 25, the valves A, B, C opening again and the sequence of operation being repeated. Alternatively the pump can be stopped when the valves A, B and C have opened. Then the pump can be started again when the sequence of operation is to be repeated.

Although, in the sequence of operation just described, corresponding valves in the sprinkler supply pipes 22, 23, 24 are opened and closed together and the valves in each sprinkler supply pipe are opened in order, starting with the valve at the upstream end of the pipe, any other order of operation may be adapted by appropriate setting or selection of the ratchet wheels 11 of the valves.

What I claim as my invention and desire to secure by Letters Patent of the United States is:

1. A valve including a valve member biased to a closed position and movable therefrom towards an open position in response to pulses of fluid pressure applied to said valve member, and a ratchet wheel having a plurality of equally-spaced teeth of uniform shape and size in circumferential sequence around the ratchet wheel and, interposed between two adjacent uniform teeth, a radially deeper tooth spaced from the adjacent following tooth by a circumferential distance greater than the circumferential spacing of said uniform teeth, wherein the improvement comprises a pivotally mounted pawl carried by the valve member and movable in step-by-step increments by said valve member in response to successive pressure pulses applied thereto and engageable with the teeth of the ratchet wheel and a fixed abutment to be engaged by the pawl to hold the valve member closed, when the pawl is engaged by each of said uniform teeth, said pawl becoming disengaged from the fixed abutment to permit the valve member to open, only when the pawl is engaged by said radially deeper tooth.

2. A pipe-line system comprising a main pipe to which an intermittent or pulsating pressurised fluid supply is to be applied, a plurality of branch-pipes communicating with said main pipe, each said branch-pipe containing at least one valve as claimed in claim 1.

3. A pipe-line system as claimed in claim 2 in which at least one of said valves is arranged to be opened after receiving a different number of pressure pulses than other of said valves.

4. A pipe-line system as claimed in claim 2 in which at least one of said valves is arranged to be opened by a different pressure pulse than that by which another of said valves is opened.

References Cited

UNITED STATES PATENTS

| 2,793,908 | 5/1957 | Carver | 137—624.14 |
| 3,145,736 | 8/1964 | Gheen | 239—66 |

FOREIGN PATENTS

| 952,040 | 11/1956 | Germany. |

WILLIAM F. O'DEA, Primary Examiner

HOWARD M. COHN, Assistant Examiner

U.S. Cl. X.R.

137—624.18; 239—66; 251—230